2,937,951
STABILIZATION OF VITREOUS ENAMEL STAINS

Malcolm D. Beals, Fanwood, and Laurence R. Blair, Gilette, N.J., and John W. Lindenthal, Denver, Colo., assignors to National Lead Company, New York, N.Y., a corporation of New Jersey No Drawing. Filed Jan. 24, 1955, Ser. No. 483,831

1 Claim. (Cl. 106—48)

This invention relates to vitreous enamels. More specifically this invention relates to colored vitreous enamels and to improved colored stains therefor.

This application is a continuation-in-part of our application Serial No. 414,501 filed March 5, 1954 and now abandoned.

Color stains for vitreous enamels are well known to the art. In general they are colored inorganic compounds of various metals and particularly the colored oxides of such metals. Sometimes they are employed in combination with other, non-coloring, oxides such as silica, alumina, or the like. Many of these coloring oxides however, while giving no difficulties in most vitreous enamel compositions, are subject to certain disadvantages when used in compositions containing titania, either as an opacifier or as a melted-in constituent of the enamel composition.

When used in enamels of this type many of the coloring oxides apparently undergo a reaction with the titania present, producing color changes. The colors produced by such color changes, moreover, are generally unstable, and are altered by subsequent firing temperatures. This characteristic renders exceedingly close temperature control in the firing kiln imperative, and makes it extremely difficult to reproduce a desired shade. Moreover, these altered colors are unstable to refiring so that they are completely unsuitable for use in operations where several firings are required.

It is therefore an object of this invention to provide color stains adaptable for use in vitreous enamel compositions. It is a further object of this invention to provide improved color vitreous enamels. Another object is to provide vitreous enamel stains suitable for use in titania-containing enamels. An additional object is to provide colored vitreous enamel compositions which are stable to variations in temperature and to multiple firings. Other objects and advantages will become apparent from the following more complete description and claim.

In its broadest aspects this invention contemplates a color stain adaptable for use in vitreous enamel compositions and stable against color changes at firing temperatures, said composition comprising a metal titanate of cobalt, nickel, manganese or copper or a mixture of said titanate and either an oxide of titanium or an oxide of one of the metals recited above, the compositions being co-calcined at temperatures from about 1200° C. to about 1600° C. This invention further contemplates a process for producing the color stain for use in vitreous enamels which comprises admixing an oxidic compound of titanium and an oxidic compound of cobalt, nickel, manganese or copper and co-calcining the mixture at a temperature from about 1200° C. to about 1600° C. to produce a color stable product. This invention also contemplates vitreous enamel compositions containing stable color stains and a process for producing the same.

It has been found that by admixing an oxidic compound of titanium and an oxidic compound of one of the metals mentioned above and co-calcining the mixture at certain temperatures, the color-change reactions which are troublesome at ordinary maturing temperatures are brought to completion, producing color stains which may then be incorporated as mill additions in vitreous enamel compositions and may be fired and refired at any practical temperature without substantial change in color. The temperatures employed may vary somewhat according to the nature of the particular oxidic metal compound employed, but in general a temperature of about 1200° C. to about 1600° C., preferably from about 1200° C. to about 1450° C., is sufficient to insure complete reaction and consequently complete stabilization. Higher temperatures may be employed as desired, the only upper temperature limits being those imposed by economy, by apparatus limitations and by the precise color desired from the particular compound employed. Temperatures lower than 1200° C. should be avoided since unstable color stains are obtained when the mixture is calcined below 1200° C. The holding time at the stabilizing temperature appears to be unimportant and the time required to heat the mixture to calcining temperature and subsequently cool it to room temperature appears to be sufficient, in ordinary cases, for complete reaction to take place, although in practice a short holding period is ordinarily employed to ensure complete reaction.

The metal oxidic compounds which have been most susceptible, when used in titania-containing enamels, to the disadvantages above mentioned are those of cobalt, nickel, copper and manganese and therefore the use of these compounds are contemplated in the instant invention. For most efficient stabilization without undue dilution of the coloring power of the particular oxidic compound employed, the quantity of oxidic compound of titanium used should preferably be sufficient to provide stoichiometrically for the formation of the corresponding titanates namely $CoTiO_3$, $NiTiO_3$, $CuTiO_3$ or $MnTiO_3$.

Co-calcined mixtures of these constituents, which have been heated above 1200° C. produce stable colors and when these colors are incorporated into vitreous enamel frit compositions, no color change is produced when the frit compositions are subsequently fired. These color stains produced by co-calcining the mixtures at high temperatures should not be confused with ordinary colored pigments produced at lower calcination temperatures since the color of the pigment material will vary upon firing when employed in frit compositions.

These stoichiometric ratios are not critical and may be varied over a fairly wide range, for example, from about one-half to about twice the quantity of titania equivalent to the quantity of metal oxide employed. Even smaller quantities of titanium may of course be used but the effects will be correspondingly diminished. Higher amounts of titania than those just mentioned may also be employed without adversely affecting the stability of the resulting stains, but are generally not preferred, since the intensity of the color obtained tends to diminish with increasing $TiO_2$ content.

In the case of copper, it has been found that improved gloss is obtained if alumina is present. The amount of alumina may vary over a rather wide range, but excellent results have been obtained when using a composition corresponding to the formula $3CuO.3Al_2O_3.TiO_2$. Obviously, smaller amounts of alumina may be used, with gradually diminishing effect, while excessively large amounts are generally undesirable because they unduly dilute the strength of the tint obtained. It will also be noted that the alumina substitutes in part for the titania, so that smaller amounts of $TiO_2$ may be employed when alumina is present, than would otherwise be the case.

Moreover, in the case of manganese, while manganese-titania composition gives an appreciable improvement in stability, the stability of the tint obtained can be even further improved by incorporation of ceria into the composition. The preferred quantities of constituents in a stain of this type are such as to provide stoichiometrically for the formation of $MnO.CeO_2.2TiO_2$, although once more the relative proportions both of ceria and titania to manganese may be varied over a considerable range.

The source of titanium for the preparation of the color stains of this invention may be any substantially pure oxidic compound of titanium, e.g. $TiO_2$ or compound which upon calcination will produce substantially pure $TiO_2$. In practice a titanium dioxide prepared by lightly-calcining hydrous oxide of titanium is preferred since it appears to react more readily than highly-calcined products. Similarly, for the oxidic metal compound, substantially any source material may be used which produces colored oxides on calcination and which is otherwise suitable for use in vitreous enamel formulations. By the term "oxidic compound" of either titanium or the other metals is meant to include the oxide, or any oxidic compound which upon calcination forms the oxide such as, for example, the hydroxide, hydrate, carbonate, sulfate and the like.

In order to more fully illustrate the nature, method of preparation, and use of the vitreous enamel color stains of this invention, the following examples are presented:

*Example I*

A frit composition was prepared by melting together for about one hour at about 1250° C. a mixture of the following ingredients:

| | Parts by weight |
|---|---|
| $SiO_2$ | 29.8 |
| $KNO_3$ | 4.9 |
| $NaNO_3$ | 0.5 |
| $Na_2B_4O_7.10H_2O$ | 35.8 |
| $NaH_2PO_4.H_2O$ | 5.5 |
| $K_2SiF_6$ | 7.8 |
| $TiO_2$ | 15.7 |

The calculated composition of the resulting frit expressed in weight percent was as follows:

| Component: | Weight percent |
|---|---|
| $SiO_2$ | 39.6 |
| $K_2O$ | 7.0 |
| $Na_2O$ | 9.0 |
| $B_2O_3$ | 16.3 |
| $P_2O_5$ | 3.5 |
| $F_2$ | 5.0 |
| $TiO_2$ | 19.6 |
| | 100.0 |

A color stain for use with the above frit was prepared by grinding together 50 parts of $Co_3O_4$ and 50 parts of titanium dioxide prepared by lightly calcining hydrous titanium dioxide and co-calcining the mixture in a muffle furnace at a temperature of 1300° C. The mixture was calcined at this temperature for approximately one-half hour, or until calcination was complete as evidenced by a hard compact cake, and then removed from the furnace. The whole cycle took approximately four hours. Two parts of the resulting stain, which had a calculated composition of CoO 48.4% and $TiO_2$ 51.6%, by weight, were milled together with 100 parts of the above described frit composition and 4 parts of clay, 0.175 part $NaNO_2$, 0.20 part of $K_2CO_3$, 0.175 part KCl and 37.5 parts of demineralized water. The grinding was carried out in a conventional ball mill and was continued for 16 hours. The milled frit was then strained through a 200 mesh screen to insure the absence of any coarse particles. The strained slip was well dispersed and demineralized water was added to adjust the consistency for optimum spraying conditions.

The milled frit was then sprayed onto a ground-coated steel panel at a dry application weight of about 30 grams per square foot, dried for fifteen minutes at 150° C. and then fired under oxidizing conditions (air atmosphere) at 815° C. for three minutes. The resulting enamel was smooth, glossy, continuous and blue in color. A second coat was then sprayed on one portion of the panel and dried and the panel was again fired to 815° C., substantially as above described, so that the top coat on the resprayed portion received one firing while the exposed undercoat on the remainder had been fired twice. The refired and unrefired portions of the panel were substantially identical in appearance.

By way of comparison the full procedure was repeated but adding the stain components directly to the mill, instead of first co-calcining them. The singly fired portion of this panel had a darker blue appearance as compared with the singly fired portion of the panel on which the co-calcined stain had been used. Upon refiring of a portion of this panel the color was found to change considerably, the refired portion of the new panel exhibiting a lighter color quite unlike the unrefired portion thereof.

*Example II*

The procedure of Example I was repeated except that 47.0 parts of NiO were substituted for the 50.0 parts of $Co_3O_4$ in the stain composition so as to give a stain having the theoretical composition NiO, 48.3% and $TiO_2$, 51.7% by weight and that the co-calcination was carried out at somewhat higher temperature, namely 1450° C. Four parts of the resulting stain after co-calcination were added to 100 parts of the same frit composition described in Example I and milled together with it as above described. The resulting slip was applied to a steel panel, fired, and a portion refired as described in Example I. The enamel in this case was pale yellow in color, and was otherwise substantially identical with the enamel described above.

*Example III*

A third portion of the same frit used in the preceding examples was tinted blue-green by adding to 100 parts of frit, 2 parts of a copper-titanium stain composition prepared by co-calcining 11.0 parts of a $CuCO_3.Cu(OH)_2$ and 15.4 parts of $Al_2O_3.3H_2O$ and 2.7 parts $TiO_2$ to a temperature of 1220° C. The stain composition was approximately 38.2% CuO, 49.0% $Al_2O_3$ and 12.8% $TiO_2$. Except for the color of the tinted enamel, the results obtained were substantially the same as those already described.

*Example IV*

A stain composition was prepared by co-calcining 5.7 parts of $MnCO_3$ and 8.6 parts of $CeO_2$ and 8.0 parts $TiO_2$ at 1300° C. to give a stain composition containing 17.6% MnO, 42.7% $CeO_2$ and 39.7% $TiO_2$. Four parts of this stain composition were milled with 100 parts of the same frit employed in the preceding examples. The resulting slip was applied to a steel panel and fired at 815° C.

The resulting enamel was pink-tan in color, and was substantially stable toward changes in color upon refiring.

The color stains of the present invention produce more stable colors in porcelain and other vitreous enamels than are produced by paint pigments; they are characterized by their outstanding color stability with respect to variations in firing temperature, and may be refired without appreciable change in color.

While this invention has been described and illustrated by the examples shown, it is not intended to be strictly limited thereto, and other variations and modifications may be employed within the scope of the following claim.

We claim:

A process of preparing a color stable titanium opacified vitreous enamel which comprises preparing a color stable stain by admixing an oxidic compound of titanium and a compound selected from the group consisting of oxidic compound of cobalt, oxidic compound of nickel, oxidic compound of copper and oxidic compound of manganese said oxidic compound present in said mixture in amount from ½ to 2 moles for each mole of oxidic compound of titanium and co-calcining said mixture at temperatures from about 1200° C. to about 1600° C. to produce a color stable stain and admixing said stain with a titanium containing vitreous enamel frit composition and firing said mixture to produce said enamel.

References Cited in the file of this patent

UNITED STATES PATENTS

| | | |
|---|---|---|
| 2,010,776 | Frost | Aug. 6, 1935 |
| 2,257,278 | Schaumann | Sept. 30, 1941 |
| 2,278,867 | Deyrup | Apr. 7, 1942 |
| 2,438,335 | Earl | Mar. 23, 1948 |
| 2,441,447 | Sealright | May 11, 1948 |
| 2,623,833 | King et al. | Dec. 30, 1952 |
| 2,670,300 | Johnson et al. | Feb. 23, 1954 |
| 2,720,473 | Donahey | Oct. 11, 1955 |

FOREIGN PATENTS

| | | |
|---|---|---|
| 472,605 | Great Britain | Sept. 24, 1937 |
| 953,424 | France | Dec. 6, 1949 |